United States Patent
Geier (12)

(10) Patent No.: US 6,230,100 B1
(45) Date of Patent: *May 8, 2001

(54) METHOD AND APPARATUS FOR DIFFERENTIAL SCALE FACTOR CALIBRATION IN DIFFERENTIAL ODOMETRY SYSTEMS INTEGRATED WITH GPS

(75) Inventor: George Jeffrey Geier, Scottsdale, AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,124

(22) Filed: Jan. 31, 1997

(51) Int. Cl.[7] .............................. G06G 7/78; G01C 21/00
(52) U.S. Cl. .......................... 701/216; 701/213; 701/215; 701/214; 701/217; 342/357.02; 342/357.14; 342/457; 73/178 R
(58) Field of Search .................................. 701/213, 214, 701/215, 216, 217, 206, 207, 224, 200, 220, 221; 340/988, 995, 990; 342/357, 457, 357.14, 357.12; 73/178 R, 1.77; 235/95 R

(56) References Cited

U.S. PATENT DOCUMENTS

| 4,144,571 | * | 3/1979 | Webber | 701/217 |
|---|---|---|---|---|
| 5,058,023 | * | 10/1991 | Kozikaro | 701/224 |
| 5,278,424 | * | 1/1994 | Kagawa | 701/217 |
| 5,317,515 | * | 5/1994 | Matsuzaki | 701/221 |
| 5,394,333 | * | 2/1995 | Kao | 701/217 |
| 5,402,365 |   | 3/1995 | Kozikaro et al. | 364/571.01 |
| 5,416,712 | * | 5/1995 | Geier et al. | 701/217 |
| 5,434,788 | * | 7/1995 | Seymour et al. | 701/207 |
| 5,469,158 | * | 11/1995 | Morita | 701/300 |
| 5,483,457 | * | 1/1996 | Shibata et al. | 701/213 |
| 5,525,998 | * | 6/1996 | Geier | 342/357.14 |
| 5,539,647 | * | 7/1996 | Shibata et al. | 701/213 |
| 5,583,776 | * | 12/1996 | Levi et al. | 701/217 |

* cited by examiner

*Primary Examiner*—Jacques H. Louis Jacques
(74) *Attorney, Agent, or Firm*—Bradley J. Botsch; Michael L. Smith; John J. King

(57) ABSTRACT

Calibration of a differential scale factor associated with left and right wheels of a vehicle having a terrestrial navigation system. The terrestrial navigation system includes a GPS receiver integrated with a dead reckoning system. The dead reckoning system has wheel sensors coupled to the left and right wheels. The calibration of the differential scale factor includes: determining a heading change with the dead reckoning system, using the determined heading change to determine an open loop heading, determining an error in the differential scale factor based on the open loop heading and an alternate heading, and using the error in the differential scale factor to adjust an initial value of the differential scale factor.

24 Claims, 4 Drawing Sheets

METHOD AND APPARATUS FOR DIFFERENTIAL SCALE FACTOR CALIBRATION IN DIFFERENTIAL ODOMETRY SYSTEMS INTEGRATED WITH GPS

BACKGROUND OF THE INVENTION

Use of global positioning satellite (GPS) receivers in automotive navigation, emergency messaging, and tracking systems is now widespread. However, systems based solely on GPS generally do not work well in dense city environments, where signal blockage and reflection by tall buildings, in addition to radio frequency interference, often occurs. A cost effective solution to this problem is to augment the GPS receiver with some form of Dead Reckoning (DR), to fill in the gaps occurring as a result of loss of GPS coverage and improve the accuracy of the GPS trajectory.

A DR system may take the form of an interface to separate left and right wheel sensors installed in the vehicle to provide an indication of the speed of each wheel. The average speed of each wheel is used to determine the vehicle velocity, while the wheel speed difference divided by the distance between the wheels (the wheel track) is used to determine changes in the vehicle heading. The accuracy of the DR system is critically dependent upon the accuracy to which the vehicle's heading is determined whereby each degree of heading error, in the absence of GPS, produces a cross-track position error which grows approximately as 1.7% of distance traveled.

A substantial source of error in the use of differential wheel speed to track the heading of a movable vehicle is the difference in the sizes of the two tires on which the speed sensors are installed. This differential tire size, if unknown to the navigation system, produces an error growth in the predicted heading of the vehicle which grows linearly with distance traveled, and a cross-track position error which grows quadratically with distance traveled. Even a minute difference in tire size can produce very large navigation error: a ratio in tire sizes of 1.001 (corresponding to one tire being 0.1% larger then the other) will produce 300 meters of cross track position error after only 1 kilometer of travel.

U.S. Pat. No. 5,402,365, assigned to the same assignee of the subject application, describes a system for estimating the differential scale factor but requires periods of essentially straight travel to perform an adequate calibration and does so without the use of GPS. Such a system may degrade in accuracy and/or speed of convergence in areas where straight roads are the exception (e.g., as exists in Europe).

Accordingly, the present invention reduces this error growth by automatically calibrating the differential scale factor (i.e., the ratio of the tire sizes) between the left and right wheels by utilizing GPS information and a Kalman filtering algorithm thereby exhibiting rapid and accurate calibration, independent of road turns or shape.

DETAILED DESCRIPTION OF THE DRAWINGS

Figure 1:
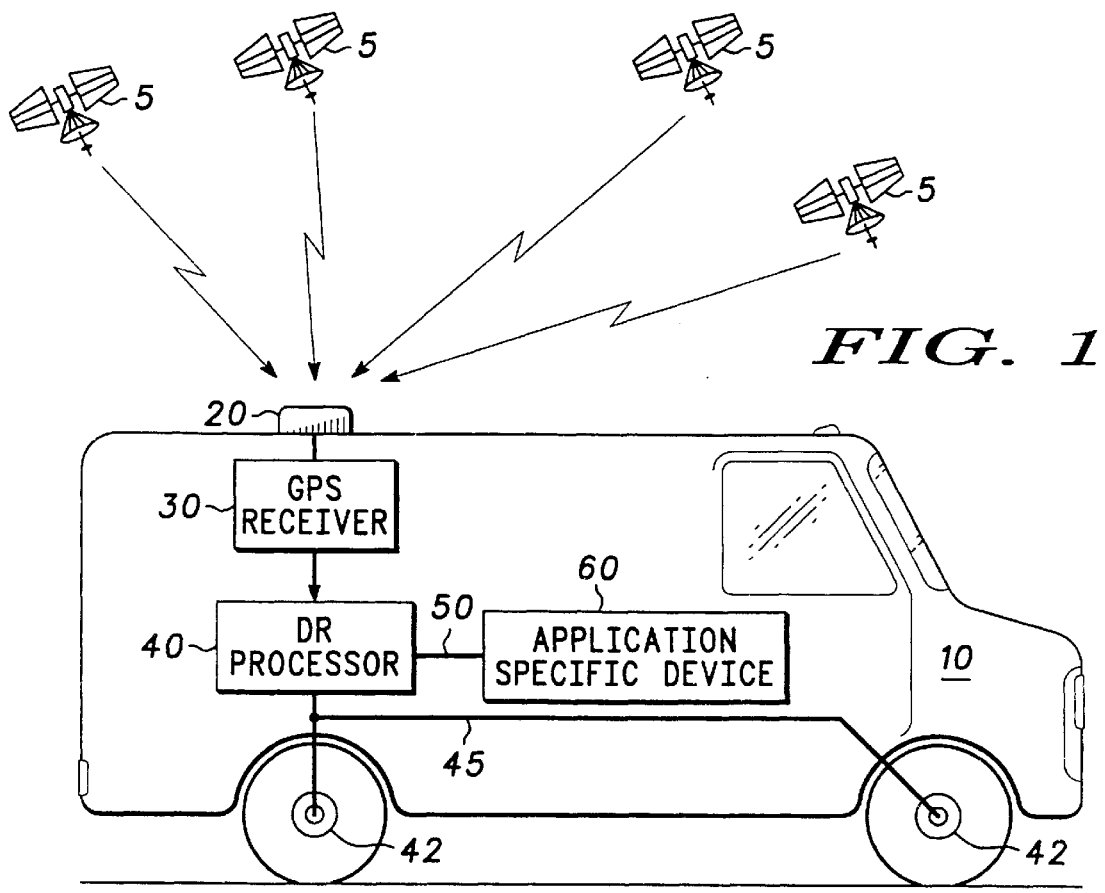
FIG. 1 is a block diagram illustrating the components of a GPS and DR system installed in a movable vehicle.

Referring to FIG. 1, a block diagram illustrating components of a terrestrial navigation system, including a GPS receiver and a DR system, installed in a movable vehicle 10 is shown. FIG. 1 includes DR processor 40 and GPS receiver 30 that is coupled to a GPS antenna 20, all of which are suitable for installation in movable vehicle 10. FIG. 1 also includes wheel sensors 42 that are coupled to the wheels of movable vehicle 10 for obtaining wheel speed data and providing such data to DR processor 40 via signal lines 45. Sensors 42 are typically installed on the non-driven wheels of vehicle 10 and, thus, may be installed in either the front or rear wheels of vehicle 10 depending upon whether the vehicle is rear wheel drive or front wheel drive, respectively. Further, although the use of sensors 42 on non-driven wheels is preferred to reduce the effects of wheel skidding that more prominently occurs with the driven wheels, sensors 42 may be installed on both the front and rear wheels of vehicle 10 whereby benefits may be derived from use of speed data from all four wheels.

Also shown in FIG. 1 are a plurality of GPS satellites 5 for generating GPS signals that are received by the GPS receiver 30 for enabling GPS receiver 30 to determine the position of movable vehicle 10 in a well known manner. Generally, four satellites are required for enabling GPS receiver 30 to obtain a three-dimensional position fix for vehicle 10.

DR processor 40, which may be embedded in the GPS receiver, receives Doppler or heading measurements from GPS receiver 30, and accepts wheel speed data 45 from wheel sensors 42. The DR processor 40 also outputs the integrated position data 50 to an application specific device 60. For vehicle navigation applications, application specific device 60 may be a separate processor which implements a map matching algorithm to locate the vehicle on the correct street and to generate a display visible to the driver. For emergency messaging and vehicle tracking applications, application specific device 60 may provide the necessary interface to a cellular phone or radio for establishing a communication link to proper third parties thereby informing such third parties of the location of movable vehicle 10.

Figure 2:
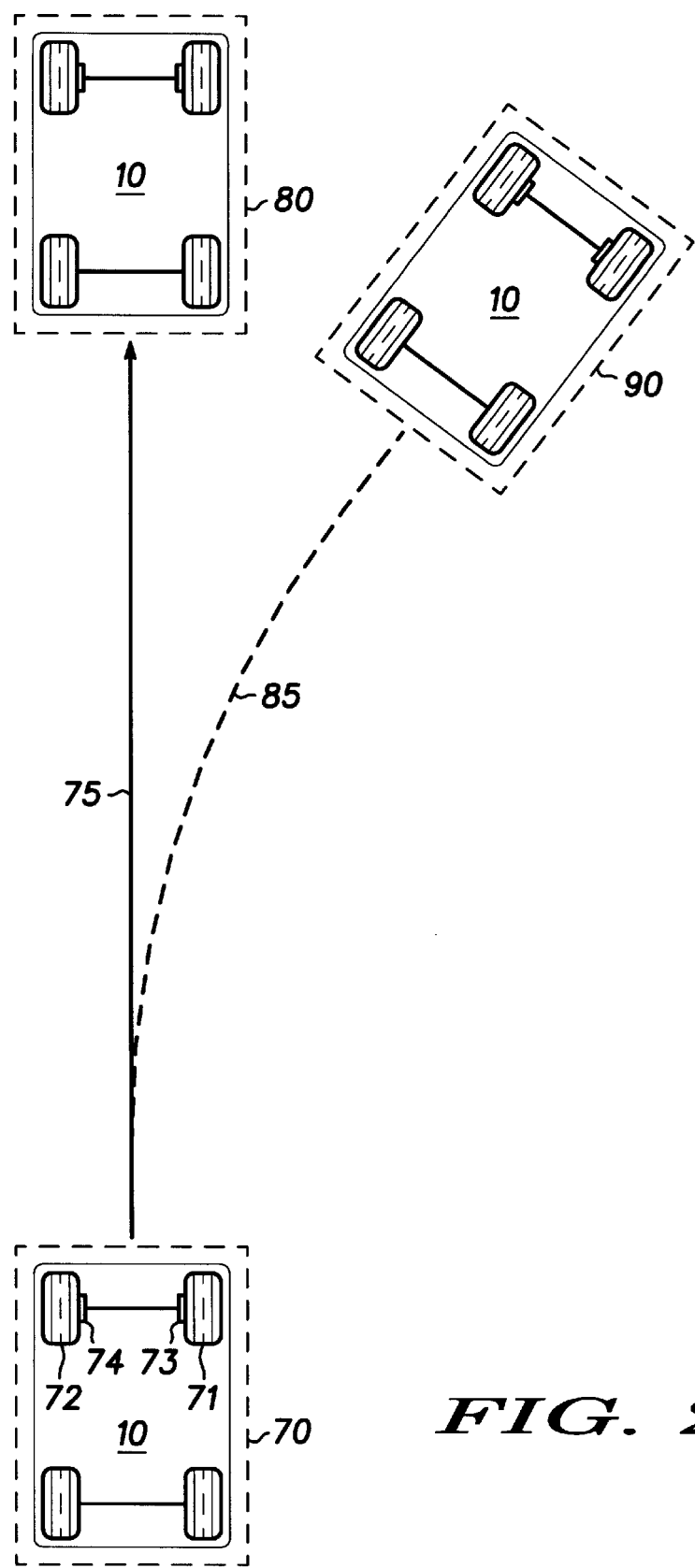
FIG. 2 is an illustration of the effect of differential tire size upon vehicle heading determination, which motivates the preferred embodiment of the invention.

Referring to FIG. 2, an initial position 70 and final position 80 of movable vehicle 10 is illustrated, with vector 75 denoting the straight direction of travel for said vehicle. Assume that wheel sensors 73, 74 are installed on the front wheels 71, 72 of movable vehicle 10, and used to determine its speed and heading. Further, assume that the left tire 72 is 1% smaller than the right tire, due to differential tire pressure, thereby producing a differential between the sizes of the two tires. If the straight travel indicated by vector 75 corresponds to 100 meters distance, then, the left wheel sensor 74 will indicate that the left wheel has traveled 101 meters, while the right wheel sensor 73 will indicate that 100 meters have been traveled by the right wheel. Thus, even though the vehicle has been traveling in a straight line, as denoted by vector 75, an apparent heading change/error of 1 meter divided by the wheel track (the distance between the wheels) will be derived from the wheel sensor data. Accordingly, a heading error of approximately 38 degrees will result for a 1.5 meter wheel track. Since the left wheel is (incorrectly) sensed to travel a greater distance, an apparent clockwise heading change of the vehicle results, as illustrated by the dashed line 85 in FIG. 2. This heading error will develop linearly with distance, and simultaneously produce a cross-track position error growth, which leads to a predicted final location 90 of movable vehicle 10 which is in error due to the differences in the tire sizes.

However, the present invention provides an apparatus and method for determining and calibrating for any differential tire size on a vehicle by determining a differential scale factor using GPS information. By calibrating the differential scale factor in real-time using GPS, the present invention substantially removes this error growth, which produces a dramatic improvement in positioning accuracy when GPS coverage is lost, and when the DR solution is exclusively used. This real-time calibration, since it operates continuously when GPS is available, will reflect the effect of current road conditions, as well as variations in differential tire pressure attributable to temperature changes.

Figure 3:
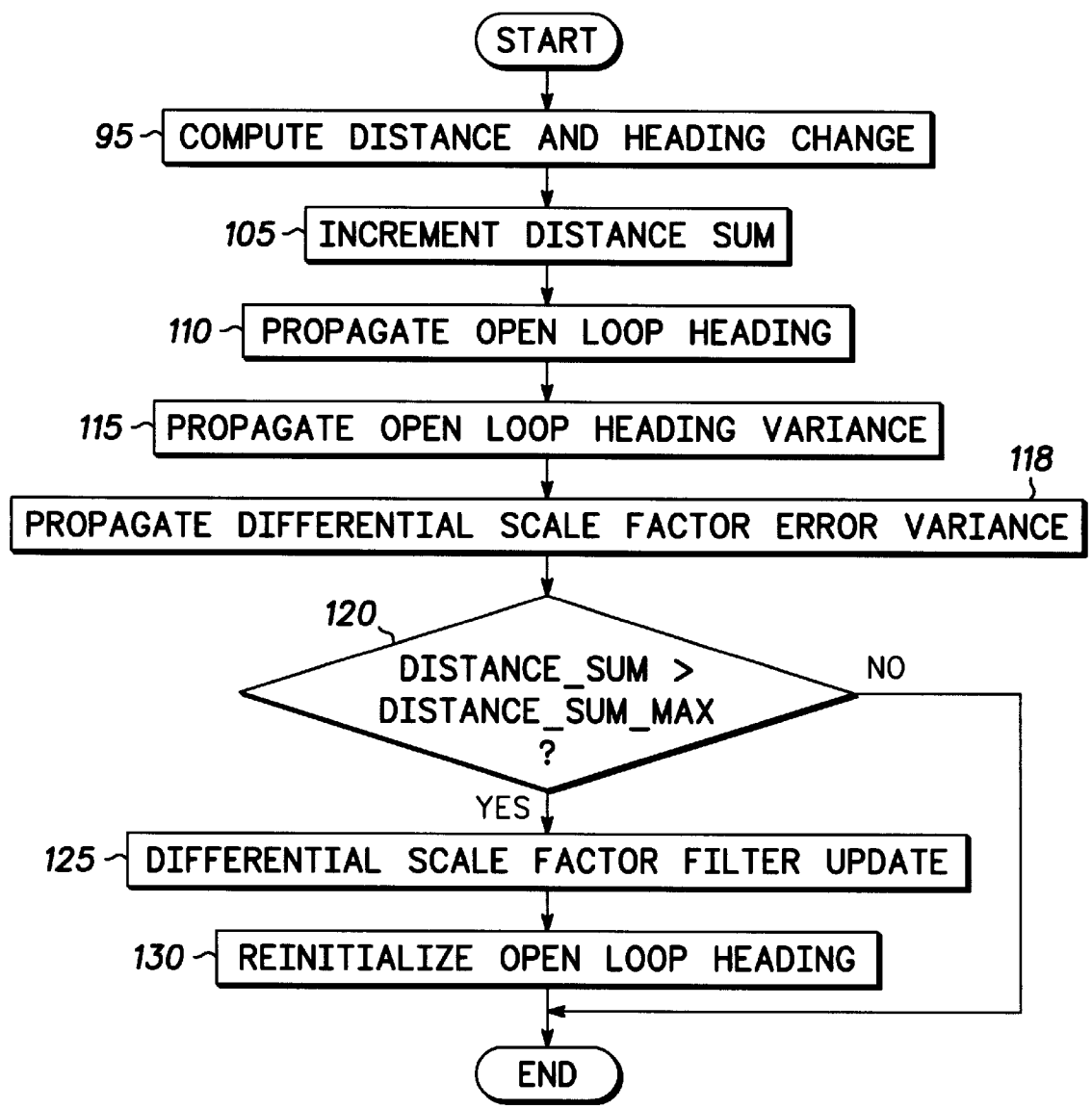
FIG. 3 is a flowchart illustrating the steps required to operate the differential scale factor filter in accordance with a preferred embodiment of the present invention.

Referring to FIG. 3, a detailed flow chart illustrating the processing steps for updating the differential scale factor is shown. First, the distance traveled d and heading change ΔH are computed from the wheel sensor data (nominally each second), as represented by box 95, using the current computed differential scale factor $Sf_{ratio}$, as given in the following equations.

$$L_d = L_c Sf_{nom}/Sf_{ratio} \quad (1)$$

$$R_d = R_c Sf_{nom} \quad (2)$$

$$d = (L_d + R_d)/2 \quad (3)$$

$$\Delta H = (L_d - R_d)/T \quad (4)$$

where:

$L_d$=distance traveled by left wheel;

$R_d$=distance traveled by right wheel;

$L_c$=accumulated pulse counts from left wheel sensor;

$R_c$=accumulated pulse counts from right wheel sensor;

$sf_{nom}$=nominal scale factor (distance corresponding to each pulse);

$sf_{ratio}$=estimated ratio of scale factors between left and right wheels (i.e., the differential scale factor); and T=wheel track of the vehicle.

The differential scale factor Sfratio is initialized to one when the system is first installed in the vehicle, and then continuously updated by the present invention pursuant to the differential scale factor filter, as shown in box 125. Since the heading error induced by differential scale factor error grows linearly with distance traveled, a distance sum is incremented (nominally each second), as represented by box 105. When this distance sum reaches a predetermined minimum level (for example, one kilometer), as represented by box 120, it will activate the differential scale factor filter update processing (125). However, during this nominal distance (i.e., 1 Km), an open loop heading $H_{OL}$ will be propagated, as represented by box 110, along with an error variance $\sigma^2_{HOL}$, as represented by box 115. This open loop heading is initialized and reinitialized, box 130, (nominally each kilometer) to a GPS heading (at the beginning of each propagation interval), and then is updated independent of GPS. Since the open loop heading $H_{OL}$ is generated independent of GPS heading information, it reflects the error growth associated with the current differential scale factor $sf_{ratio}$, and can be used in the differential scale factor update processing (125). The equations governing the propagation of open loop heading and its error variance (boxes 110 and 115) are given by the following equations.

$$H_{OL} = H_{OL} + \Delta H \quad (5)$$

$$\sigma_{HOL} = \sigma^2_{HOL} + \sigma^2_T + \sigma^2_Q \quad (6)$$

where:

$\sigma^2_T$ is the heading error variance representing imperfect knowledge of the wheel track; and $\sigma^2_Q$ is the heading error variance representing pulse quantization.

In addition to propagating the error variance associated with the open loop heading $\sigma^2_{HOL}$ (box 115), the error variance associated with the differential scale factor itself is propagated, as represented by box 118, according to Eqns. (7):

$$\sigma^2_{dsf} = \sigma^2_{dsf} + q_{dsf} d^2 \quad (7)$$

where:

$q_{dsf}$ reflects the instability of the differential scale factor error with distance traveled d.

Accordingly, FIG. 3 illustrates how the differential scale factor filter update processing (box 125) interacts with the routine computation of heading in a DR system based on wheel sensors. The filter, by design, operates infrequently (i.e., roughly each kilometer of distance traveled), to allow the residual differential scale factor error sufficient distance to produce a heading error to which can be easily recognized by the filter. The open loop heading propagation in 110, which occurs in parallel with the heading propagation used for navigation, permits this error to develop without the influence of GPS heading information.

Figure 4:
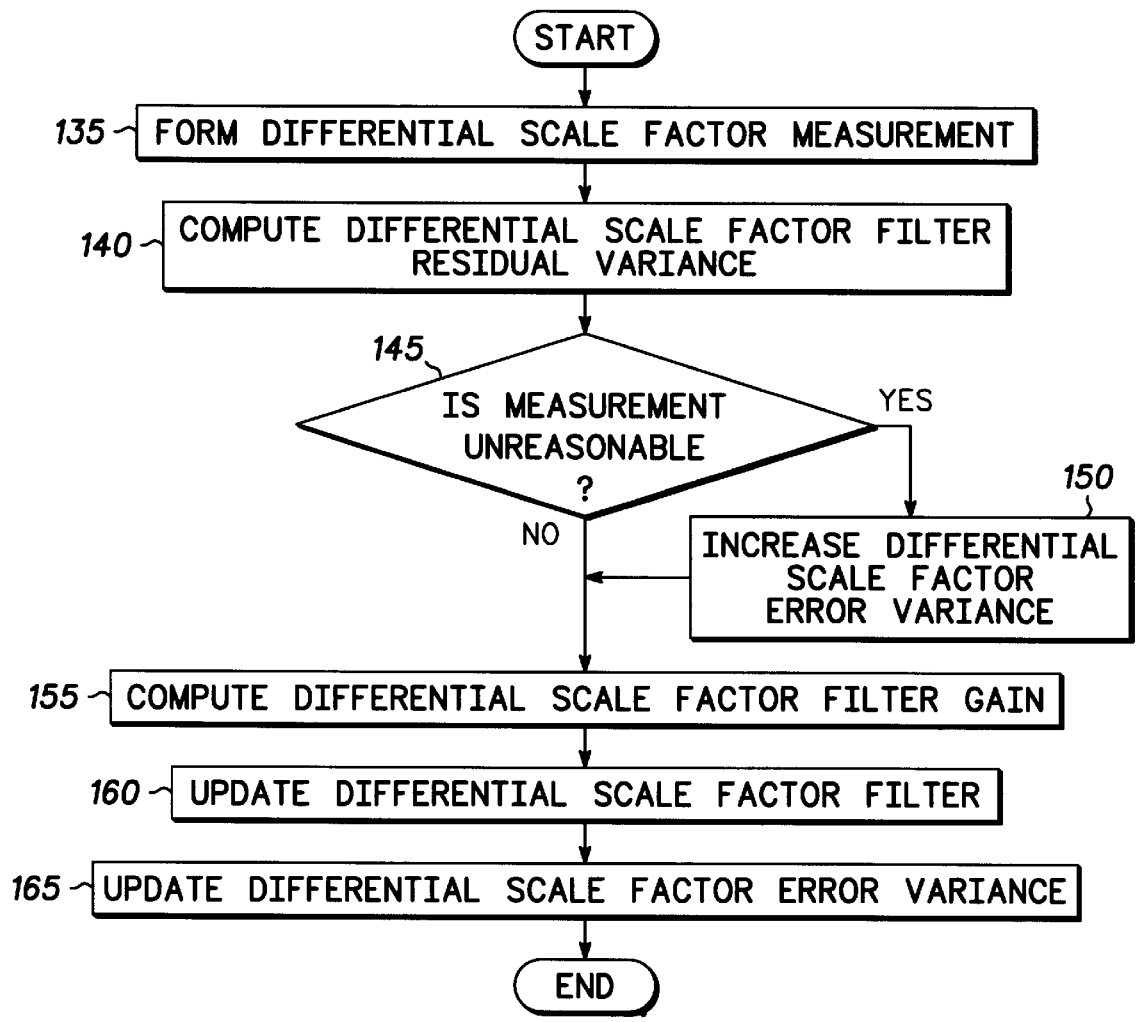
FIG. 4 is a flowchart illustrating the steps which comprise the differential scale factor filter in accordance with a preferred embodiment of the present invention.

Referring now to FIG. 4, a flow chart illustrating the detailed steps for updating the differential scale factor sfratio is shown. Accordingly, FIG. 4 represents a more detailed explanation of the processing steps associated with box 125 of FIG. 3.

The differential scale factor $sf_{ratio}$ is updated (nominally each kilometer) by first constructing a measurement of its error $\delta sf_{ratio}^{meas}$, as represented by box 135, according to Eqn. (8).

$$\delta sf_{ratio}^{meas} = T(H_{OL} - H_{GPS})/d_{sum} \quad (8)$$

where:

$H_{GPS}$=GPS indicated heading (at the end of the propagation interval); and $d_{sum}$=distance over which $H_{OL}$ is propagated (nominally one kilometer).

The error in this open loop propagation of heading is determined from the GPS derived heading at the end of the interval. The specific contribution to this heading error from the differential scale factor error is extracted by Kalman filtering of each measurement $\delta sf_{ratio}^{meas}$. The weighting attached to each measurement $\delta sf_{ratio}^{meas}$ is determined from the error variance associated with the open loop heading ($\sigma^2_{HOL}$) (excepting the contribution from the differential scale factor error itself, since this component is estimated) and the expected error or uncertainty level associated differential scale factor ($\sigma^2_{dsf}$). Further, the residual variance, $\sigma^2_{res}$, is determined from (9), as represented by box 140, and represents the expected divergence between the open loop heading and the GPS heading. This expected variation is used in a statistical reasonableness test (described below), which prevents unreasonable values from adversely affecting the differential scale factor estimate $sf_{ratio}$.

$$\sigma^2_{res} = \sigma^2_{dsf} + \sigma^2_m \quad (9)$$

where:

$$\sigma^2_m = \sigma^2_{HGPSstart} + \sigma^2_{HGPSstop} + \sigma^2_{HOL};$$

$\sigma^2_{HGPSstart}$=GPS heading error variance at propagation start; and $\sigma^2_{HGPSstop}$=GPS heading error variance at propagation stop.

The differential scale factor error measurement, $\delta sf_{ratio}^{meas}$, is then assessed for reasonableness before it is used to update the differential scale factor $sf_{ratio}$. The reasonableness test, as represented by box 145, includes comparing the square of the measurement $\delta sf_{ratio}^{meas}$ with the residual variance $\sigma^2_m$, as determined from Eqn. (9) whereby if the square is more than some multiple of the variance, the measurement is considered unreasonable and will be rejected. The variance multiple which is selected is a function of how conservative the test should be. For example, a value of four implies that a "two sigma" error, which should not occur more than 5% of the time (based on a normal statistical distribution) will trigger a statistical rejection, while a value of nine implies that a "three sigma" error, which should not occur more than 1% of the time (based on a normal statistical distribution) will cause a rejection.

A measurement which is considered unreasonable is indicative of either a sudden change in differential tire pressure (as would be induced by adding air to one or both of the tires) or a change in one or both of the tires upon which the sensors are installed. Under either of these circumstances, the differential scale factor has changed abruptly. Two possible techniques exists for rapidly adjusting the differential scale factor: (1) resetting the differential scale factor to a predetermined value such as a measured value for the differential scale factor, or (2) increasing the expected uncertainty level associated with the estimate of the differential scale factor by the magnitude of the measurement $\delta f_{ratio}^{meas}$ squared. Increasing the residual variance in this manner ensures a rapid convergence to the new differential scale factor.

Following this, the Kalman gain $k_{gain}$ is computed, as represented by box 155, and according to Eqn. (10), and the differential scale factor $sf_{ratio}$ can be revised, as represented by 160, and according to Eqn. (11).

$$k_{gain} = \sigma^2_{dsf}/\sigma^2_{res} \quad (10)$$

$$sf_{ratio} = sf_{ratio} + k_{gain}\delta sf_{ratio}^{meas} \quad (11)$$

Finally, the error variance associated with the differential scale factor, $\sigma^2_{dsf}$ is updated, as represented by box 165, to reflect the improved accuracy derived from processing the current measurement according to Eqn. (12).

$$\sigma^2_{dsf} = (1-k_{gain})\sigma^2_{dsf} \quad (12)$$

Note that Eqns. (10) through (12) realize a conventional, single state Kalman filter. Because GPS heading error is dominated by selective availability (which is not well represented by the standard Kalman white noise model), and as a guard against possible errors induced by finite numerical precision, the error variance associated with the differential scale factor $\sigma^2_{dsf}$ is lower-limited each time that Eqn. (12) is used.

In summary, the present invention describes a method and apparatus for removing a substantial source of error in DR systems based on wheel speed sensors installed on the left and right wheels of an equipped vehicle. This error effect is caused by the (unknown) difference in the left and right tire sizes. The present invention expands on prior art in that it does not require specific road conditions, e.g., straight travel, to perform the calibration, but rather, relies upon GPS heading information in a unique way to identify the difference in the effective tire sizes. A Kalman filter approach is used to extract the error contribution from differential tire size from an open loop, parallel propagation of the wheel sensor-based heading changes over a known distance. The invention has been demonstrated to reduce heading error growth of an uncalibrated system by more than one order of magnitude, and the corresponding position error growth by more than two orders of magnitude in closed loop trajectories of the test vehicle.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided.

What is claimed is:

1. A method for calibrating a differential scale factor associated with left and right wheels of a movable vehicle in which a terrestrial navigation system is installed, said terrestrial navigation system comprised of a GPS receiver integrated with a dead reckoning system, said dead reckoning system utilizing wheel sensors coupled to said left and right wheels, said method comprising the steps of:

determining a heading change based upon said dead reckoning system, said differential scale factor of said dead reckoning system having an initial value wherein said differential scale factor is indicative of a difference in size of tires attached to the left and right wheels;

using said determined heading change derived from said dead reckoning system to determine an open loop heading;

summing successive determined values of said open loop headings over a time period based upon said movable vehicles traveling a predetermined distance;

determining an error in said differential scale factor based upon said summed successive open loop headings and a heading computed by said GPS receiver; and using said error in said differential scale factor to adjust said initial value of said differential scale factor.

2. The method of claim 1 wherein said steps of determining a heading change, using said determined heading change and determining an error in said differential scale factor are repeated to further adjust said differential scale factor.

3. The method of claim 1 wherein said predetermined distance is one kilometer.

4. The method of claim 1 wherein said error in said differential scale factor is tested for reasonableness before being used to adjust said differential scale factor.

5. The method of claim 1 wherein said open loop heading is initialized to a value based upon a GPS heading from said GPS receiver.

6. The method of claim 1 wherein said initial value of said differential scale factor is one.

7. The method of claim 1 wherein said alternate heading is determined at a time when said movable vehicle has traveled a predetermined distance.

8. The method of claim 1 wherein said error in said differential scale factor is adjusted in real time.

9. The method of claim 1 wherein said dead reckoning system includes wheel sensors installed on front wheels of said movable vehicle.

10. The method of claim 1 wherein said dead reckoning system includes wheel sensors installed on rear wheels of said movable vehicle.

11. The method of claim 1 wherein said dead reckoning system includes wheel sensors installed on both front and rear wheels of said movable vehicle.

12. A method for calibrating a differential scale factor associated with left and right wheels of a movable vehicle in which a terrestrial navigation system is installed, said terrestrial navigation system comprised of a GPS receiver integrated with a dead reckoning system, said dead reckoning system utilizing wheel sensors coupled to said left and right wheels, said method comprising the steps of:

determining a heading change based upon said dead reckoning system, said differential scale factor of said dead reckoning system having an initial value wherein said differential scale factor is indicative of a difference in size of tires attached to the left and right wheels;

using said determined heading change derived from said dead reckoning system to determine an open loop heading;

determining an error in said differential scale factor based upon said summed successive open loop headings and a heading computed by said GPS receiver, wherein said error in said differential scale factor is tested for reasonableness before being used to adjust said differential scale factor by comparing the square of said error in said differential scale factor with a residual variance; and using said error in said differential scale factor to adjust said initial value of said differential scale factor.

13. An apparatus for calibrating a differential scale factor associated with left and right wheels of a movable vehicle, said apparatus comprising:

wheels sensors, coupled to said left and right wheels of said movable vehicle, for determining distance traveled by said left and right wheels;

means for determining a heading change of said movable vehicle based upon said distance traveled by said left and right wheels, said differential scale factor having an initial value wherein said differential scale factor is indicative of a difference in size of tires attached to the left and right wheels;

means, responsive to said means for determining said heading change, for determining an open loop heading;

means, responsive to said means for determining said open loop heading, for summing successive determined values of said open loop headings over a time period based upon said movable vehicle traveling a predetermined distance;

a GPS receiver for computing a heading of said movable vehicle;

means for determining an error in said differential scale factor based upon said summed successive open loop headings and said heading of said GPS receiver; and means, responsive to said error in said differential scale factor, for adjusting said initial value of said differential scale factor.

14. The apparatus of claim 13 further including means for repeatedly adjusting said differential scale factor based upon additional determined errors in said differential scale factor.

15. The apparatus of claim 13 wherein said predetermined distance is one kilometer.

16. The apparatus of claim 13 further including means for testing said error in said differential scale factor for reasonableness before being used to adjust said differential scale factor.

17. The apparatus of claim 16 wherein said means for testing includes means for comparing the square of said error in said differential scale factor with a residual variance.

18. The apparatus of claim 13 wherein said open loop heading is initialized to a value based upon a GPS heading from said GPS receiver.

19. The apparatus of claim 13 wherein said initial value of said differential scale factor is one.

20. The apparatus of claim 13 wherein said heading of said alternate means is determined at a time when said movable vehicle has traveled a predetermined distance.

21. The apparatus of claim 13 wherein said error in said differential scale factor is adjusted in real time.

22. The apparatus of claim 13 wherein said wheel sensors are installed on front wheels of said movable vehicle.

23. The apparatus of claim 13 wherein said wheel sensors are installed on rear wheels of said movable vehicle.

24. The apparatus of claim 13 wherein said wheel sensors are installed on both front and rear wheels of said movable vehicle.

* * * * *

UNITED STATES PATENT AND TRADEMARK OFFICE
CERTIFICATE OF CORRECTION

PATENT NO. : 6,230,100 B1
DATED : May 8, 2001
INVENTOR(S) : Geier

Page 1 of 1

It is certified that error appears in the above-identified patent and that said Letters Patent is hereby corrected as shown below:

<u>Title page,</u>
Item [54], before "METHOD", insert -- A --
After "SYSTEMS", delete "INTEGRATED WITH GPS"

Signed and Sealed this

Eighteenth Day of December, 2001

Attest:

Attesting Officer

JAMES E. ROGAN
Director of the United States Patent and Trademark Office